(12) United States Patent
Narukiyo (10) Patent No.: US 11,880,963 B2
(45) Date of Patent: *Jan. 23, 2024

(54) APPARATUS AND METHOD FOR IMAGE PROCESSING (71) Applicant: CANON KABUSHIKI KAISHA, Tokyo (JP)

(72) Inventor: Yuta Narukiyo, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,610

(22) Filed: Jan. 5, 2023

(65) Prior Publication Data
US 2023/0153966 A1    May 18, 2023

Related U.S. Application Data (63) Continuation of application No. 17/145,105, filed on Jan. 8, 2021, now Pat. No. 11,574,390.

(30) Foreign Application Priority Data

Jan. 20, 2020  (JP) .................................. 2020-006899
Jan. 20, 2020  (JP) .................................. 2020-006936

(51) Int. Cl.
*G06T 5/00*   (2006.01)
*G06N 3/08*   (2023.01)
*G06N 20/00*  (2019.01)

(52) U.S. Cl.
CPC ............... *G06T 5/009* (2013.01); *G06N 3/08* (2013.01); *G06N 20/00* (2019.01); *G06T 5/002* (2013.01); *G06T 5/003* (2013.01)

(58) Field of Classification Search
CPC ......... G06T 5/009; G06T 5/002; G06T 5/003; G06N 3/08; G06N 20/00
See application file for complete search history.

(56) References Cited

U.S. PATENT DOCUMENTS

| 11,574,390 B2 * | 2/2023 | Narukiyo ............. H04N 1/6027 |
| 2020/0151509 A1 * | 5/2020 | Sunkavalli ........... G06V 10/776 |

FOREIGN PATENT DOCUMENTS

| JP | 2007234000 A | 9/2007 |
| JP | 2019121252 A | 7/2019 |

OTHER PUBLICATIONS

R. Norman Hurst, "The Future's So Bright, I Gotta Wear Shades: Test Patterns for HDR", [online], Nov. 21, 2023, pp. 1-8.

(Continued)

*Primary Examiner* — Phuoc Tran
(74) *Attorney, Agent, or Firm* — CANON U.S.A., INC. IP Division (57) ABSTRACT

An apparatus includes one or more processors that function as an image acquisition unit configured to acquire a training image and a correct answer image, a generation unit configured to input the training image to a neural network to generate an output image, an error acquisition unit configured to subject each of the correct answer image and the output image to processing for adjusting a color signal value, and acquire an error between the correct answer image and the output image that have been subjected to the processing, and an update unit configured to update parameters of the neural network based on the acquired error.

8 Claims, 8 Drawing Sheets

(56) References Cited

OTHER PUBLICATIONS

Sivatogeswaran Ratnasingam, "Deep Camera: A Fully Convolutionat Neural Network for Image Signal Processing", [online], Aug. 24, 2019, https://arxiv.org/abs/1908.09191, [Nov. 14, 2023]; pp. 1-11.

* cited by examiner

APPARATUS AND METHOD FOR IMAGE PROCESSING

CROSS-REFERENCE TO RELATED APPLICATION

This application is a Continuation of U.S. application Ser. No. 17/145,105, filed Jan. 8, 2021; which claims priority from Japanese Patent Application No. 2020-006936, filed Jan. 20, 2020, and No. 2020-006899, filed Jan. 20, 2020, which are hereby incorporated by reference herein in their entirety.

BACKGROUND OF THE DISCLOSURE

Field of the Disclosure

The aspect of the embodiments relates to an image processing technique using deep learning.

Description of the Related Art

In recent years, there has been proposed an image processing technique that uses deep learning as machine learning to infer a desired output image from an input image. Deep learning is, for example, machine learning using a neural network. To input a RAW image to a neural network to infer a desired output image, the learning of the neural network is also performed using RAW images.

Japanese Patent Application Laid-Open No. 2019-121252 discusses a technique that uses a neural network to infer an image having an improved resolution or contrast from an input image using a RAW image. In the technique discussed in Japanese Patent Application Laid-Open No. 2019-121252, when a RAW image is input to the neural network for learning, gamma correction is performed based on the output format of the image to be viewed by the user, so that the learning of the neural network can be performed with improved inference accuracy.

The image actually viewed by the user is the image obtained by subjecting a RAW image to white balance correction or development processing. Thus, the RAW image inferred by the neural network is also subjected to the white balance correction or the development processing. However, if image processing including the white balance correction is applied to the image inferred by the neural network, the tint of the image may change.

In addition, when the user actually views an image, the RAW image may be subjected to High Dynamic Range (HDR) processing, more specifically, image processing for expanding the dynamic ranges of the luminance and the color gamut. However, if the processing for expanding the dynamic ranges is applied to the RAW image inferred by the neural network, the tint of the image may change.

SUMMARY OF THE DISCLOSURE

According to an aspect of the embodiments, an apparatus includes one or more processors that execute a program stored in a memory to function as an image acquisition unit configured to acquire a training image and a correct answer image, a generation unit configured to input the training image to a neural network to generate an output image, an error acquisition unit configured to subject each of the correct answer image and the output image to processing for adjusting a color signal value, and acquire an error between the correct answer image and the output image that have been subjected to the processing, and an update unit configured to update parameters of the neural network based on the acquired error.

According to another aspect of the embodiments, an apparatus includes one or more processors that execute a program stored in a memory to function as an image acquisition unit configured to acquire a training image and a correct answer image, an execution unit configured to subject each of the training image and the correct answer image to processing for adjusting a color signal value, a generation unit configured to input the training image having been subjected to the processing by the execution unit to a neural network to generate an output image, an error acquisition unit configured to acquire an error between the correct answer image and the output image, and an update unit configured to update parameters of the neural network based on the acquired error.

Further features of the disclosure will become apparent from the following description of exemplary embodiments with reference to the attached drawings.

DESCRIPTION OF THE EMBODIMENTS

Exemplary embodiments of the disclosure will be described in detail below with reference to the accompanying drawings. In the drawings, identical components or processing are assigned the same reference numerals, and redundant descriptions thereof will be omitted.

In a first exemplary embodiment, an example of image processing using deep learning, which is machine learning using a neural network, to infer a desired output image from an input image will be described. In learning of the neural network, a plurality of training images and a plurality of teacher images corresponding to the training images are prepared, and parameters of the neural network such as weight and bias are optimized, for example, by bringing the feature distribution of the training images close to the feature distribution of the teacher images. As a result, inference can be accurately performed even for an unlearned input image. In the present exemplary embodiment, a process to perform learning to update the network parameters in image processing using a neural network is referred to as a learning process. Also, in the present exemplary embodiment, a process to perform inference on an unknown input image to acquire an inferred image by using the network parameters updated in the learning process is referred to as an inference process.

In the present exemplary embodiment, an example will be described where a RAW image is input to the neural network to infer a desired output image in the inference process. To perform this inference process, in the learning process, the learning of the neural network is performed to optimize the network parameters so as to minimize the error between an output RAW image obtained by inputting a training RAW image to the neural network, and a correct answer RAW image. In other words, the error in the learning of the neural network is minimized based on the RAW images. In the present exemplary embodiment, an example of image processing that uses a neural network to infer (generate) a noise-reduced image will be described.

Furthermore, in the present exemplary embodiment, when the user actually views an image, a RAW image inferred by a neural network is subjected to various kinds of adjustment processing such as the development processing and the white balance correction, and then displayed on a display apparatus.

However, if the RAW image inferred by the neural network is subjected to the development processing and then subjected to the white balance correction, the tint of the image may change after the correction. The inventor of the present application has found that the change occurs for the following reasons.

For example, the white balance correction is adjustment processing for changing the signal level ratio between colors of an image, i.e., the signal level ratio between color channels. More specifically, in the image after the adjustment processing, the signal level of each color channel changes with respect to the RAW image inferred by the neural network. When the signal level of each color channel changes due to the white balance correction, the error in the inference of the neural network increases. The increase in the inference error is likely to occur in a low-luminance portion of the inferred image. Since the white balance correction is processing for changing the signal amplification factor depending on the color channel, the inference error increases in the signal of the color channel having a higher amplification factor. Thus, if the error in the inference of the neural network increases in the low-luminance portion of the inferred image, a phenomenon where the low-luminance portion takes on a specific tint appears. Even when a noise-reduced image can be inferred by the neural network, noise remains in the low-luminance portion of the image after the white balance correction, resulting in the inference accuracy of the neural network being apparently low. While in the present exemplary embodiment, the white balance correction is described as an example of adjustment processing that changes the signal level ratio between colors, the adjustment processing is not limited thereto. Another adjustment processing that changes the signal level ratio between colors may cause the above-described tint change.

The same also applies to image processing for expanding the dynamic range of an image, such as High Dynamic Range (HDR) processing.

For example, to solve underexposure in a low-luminance portion and overexposure in a high-luminance portion in a certain dynamic range, HDR processing may be applied to an image. The HDR processing can express an image with an apparently expanded dynamic range by combining images captured with a plurality of exposure amounts. In addition, to improve the luminance representation in a certain dynamic range, a moving image with Standard Dynamic Range (SDR) not subjected to the HDR processing may be subjected to processing for applying a gamma curve. As a result of such image processing, an image close to what is perceived by the human eyes or an image with an apparently expanded dynamic range can be created.

With respect to expressions with the HDR technique and the SDR technique, there is also image processing that expands the dynamic range of luminance in a display apparatus such as a display. This image processing also represents a dynamic range close to what is perceived by the human eyes. Examples of the processing include processing prescribed in HDR10 or HDR10+. While, in the HDR processing, the color gamut is prescribed by Rec.2020, and the gamma curve is prescribed by the Perceptual Quantization (PQ) method or the Hybrid Log-Gamma (HLG) method, other color gamuts and gamma curves may be applied. In the SDR processing, the color gamut is prescribed by Rec.709, and the gamma curve is prescribed by International Telecommunication Union Radiocommunication Sector (ITU-R) BT.709.

However, if image processing such as the HDR processing is performed on a RAW image inferred by a neural network, the tint of the image may change after the image processing.

In image processing such as the above-described HDR processing, the signal level of each color channel changes since the image is subjected to processing for expanding the color gamut and the luminance. More specifically, like the white balance correction, if the error in the inference of the neural network increases in the low-luminance portion of the inferred image, a phenomenon where the low-luminance portion takes on a specific tint appears. While image processing in HDR and SDR has been described as an example, performing image processing including other color gamut and luminance adjustment processing may also cause the above-described tint change.

In the case of the above-described technique discussed in Japanese Patent Application Laid-Open No. 2019-121252, the issue where the image takes on a specific tint does not arise because the image processing considered to minimize the error is gamma correction.

Taking the above-described issue into consideration, an image processing apparatus according to the present exemplary embodiment makes it possible to acquire a neural network with which, even after an inferred image is subjected to the white balance correction or the color gamut and luminance expansion processing, the tint of the image hardly changes, by using the configurations and processing to be described below. Accordingly, the image processing apparatus according to the present exemplary embodiment achieves improved accuracy in inferring a noise-reduced image using a neural network.

Figure 1:
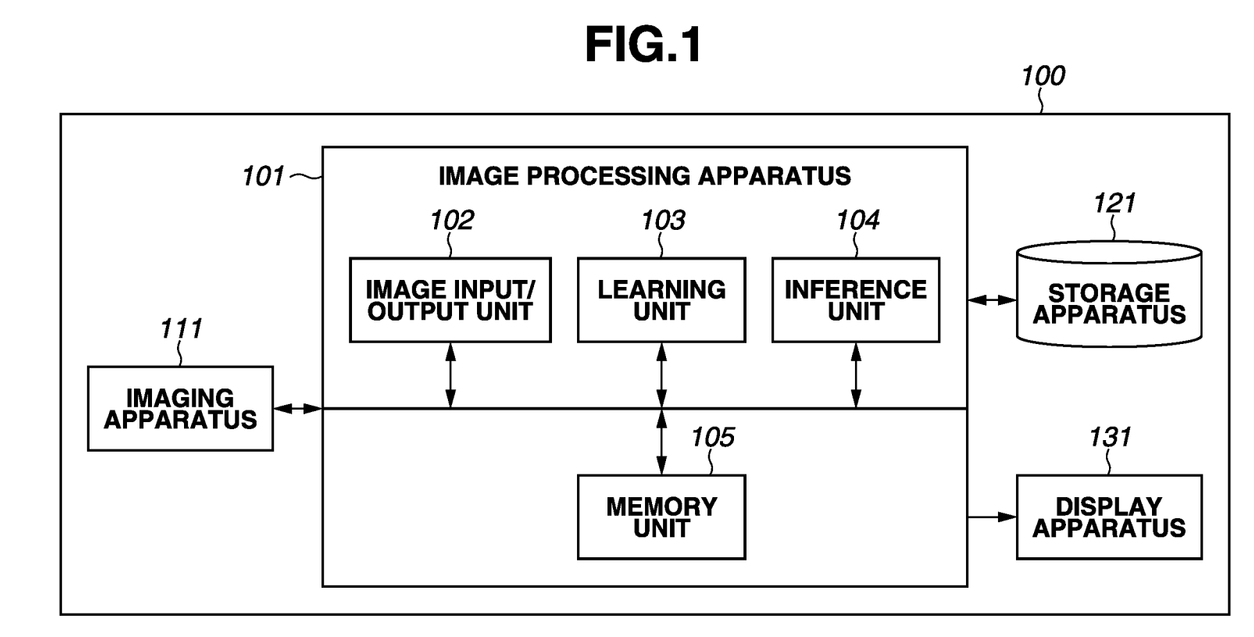
FIG. 1 is a block diagram illustrating an example of a configuration of a system including an image processing apparatus according to a first exemplary embodiment.

FIG. 1 is a block diagram illustrating an example of an overall configuration of an image processing system 100 according to the present exemplary embodiment. As illustrated in FIG. 1, the image processing system 100 includes an image processing apparatus 101 according to the present exemplary embodiment, an imaging apparatus 111, a storage apparatus 121, and a display apparatus 131.

The image processing system 100 according to the present exemplary embodiment will be described first.

The image processing apparatus 101 is capable of performing both the learning process and the inference process, and includes an image input/output unit 102, a learning unit 103, an inference unit 104, and a memory unit (or memory) 105.

The image input/output unit 102 inputs an image from the imaging apparatus 111 or the storage apparatus 121, and outputs an image to the storage apparatus 121 or the display apparatus 131.

The learning unit 103 performs the learning process to calculate the network parameters of the neural network to be used in the inference process. In the learning process, the learning unit 103 performs learning to update the network parameters by using a plurality of pairs of a training image and a correct answer image stored in the memory unit 105. When a noise-reduced image is inferred (acquired) using a neural network as with the present exemplary embodiment, the training image and the correct answer image are differentiated depending on the presence or absence of noise. The training image and the correct answer image will be described in detail below. In the present exemplary embodiment, the training image and the correct answer image are RAW images.

The inference unit 104 performs the inference process to output an image inferred using the neural network having the network parameters calculated in the learning process.

The memory unit 105 stores the network parameters calculated by the learning unit 103, the output image, the training images to be used for learning, and the correct answer images corresponding to the training images.

The imaging apparatus 111 includes an imaging optical system, and an image sensor such as a Complementary Metal Oxide Semiconductor (CMOS) sensor or a Charge Coupled Device (CCD) sensor. The imaging apparatus 111 outputs an image captured by the image sensor. The imaging apparatus 111 and the image processing apparatus 101 may have an additional function, such as a development processing function.

The storage apparatus 121 stores a large number of pairs of a training image and a correct answer image, and the network parameters updated by the learning unit 103.

The display apparatus 131, such as a liquid crystal display and a projector, displays an image received from the image processing apparatus 101.

The image processing apparatus 101 will be described in detail next.

The image processing apparatus 101 acquires captured images, which are RAW images, from the wiredly or wirelessly connected imaging apparatus 111 or the storage apparatus 121, and stores the images in the memory unit 105. At the time of inference, the inference unit 104 acquires, from the captured images, an image to be input to the neural network and then inputs the image to the neural network to infer and generate a noise-reduced image. The image processing apparatus 101 stores, in the memory unit 105, the network parameters stored in the storage apparatus 121 and then reads the network parameters from the memory unit 105 for use in the inference process. Alternatively, the network parameters may be stored by the imaging apparatus 111. The image processing apparatus 101 generates a noise-reduced image from the captured image, and outputs the generated image to at least one of the storage apparatus 121, the display apparatus 131, and the imaging apparatus 111.

The image processing apparatus 101 includes, for example, a central processing unit (CPU) or a dedicated or general-purpose processor. The processor executes various programs stored in the memory unit 105 to implement the function of each unit of the image processing apparatus 101 according to the present exemplary embodiment. The image processing apparatus 101 may also include hardware such as a Field Programmable Gate Array (FPGA) or an Application Specific Integrated Circuit (ASIC). The function of each unit of the image processing apparatus 101 according to the present exemplary embodiment may also be implemented by such hardware. The image processing apparatus 101 may implement the function of each unit related to image processing according to the present exemplary embodiment, through a combination of software processing by the processor executing the programs and hardware processing.

While in the present exemplary embodiment, the training image is a Bayer-array RAW image, a RAW image captured by using a three-plate type image sensor or by using a vertical color separation type image sensor such as FOVEON (registered trademark) sensor may be used. The pixel array of the training image is not limited to the Bayer array and may be another array type (e.g., a honeycomb structure or a filter array of an X-Trans (registered trademark) CMOS sensor). When the training image is a Bayer-array RAW image, a Bayer-array single plane or three planes of red, green, and blue may be used. While in the present exemplary embodiment, learning and inference are performed collectively for the plurality of colors, learning and inference may be performed separately for each of the colors.

Figure 2:
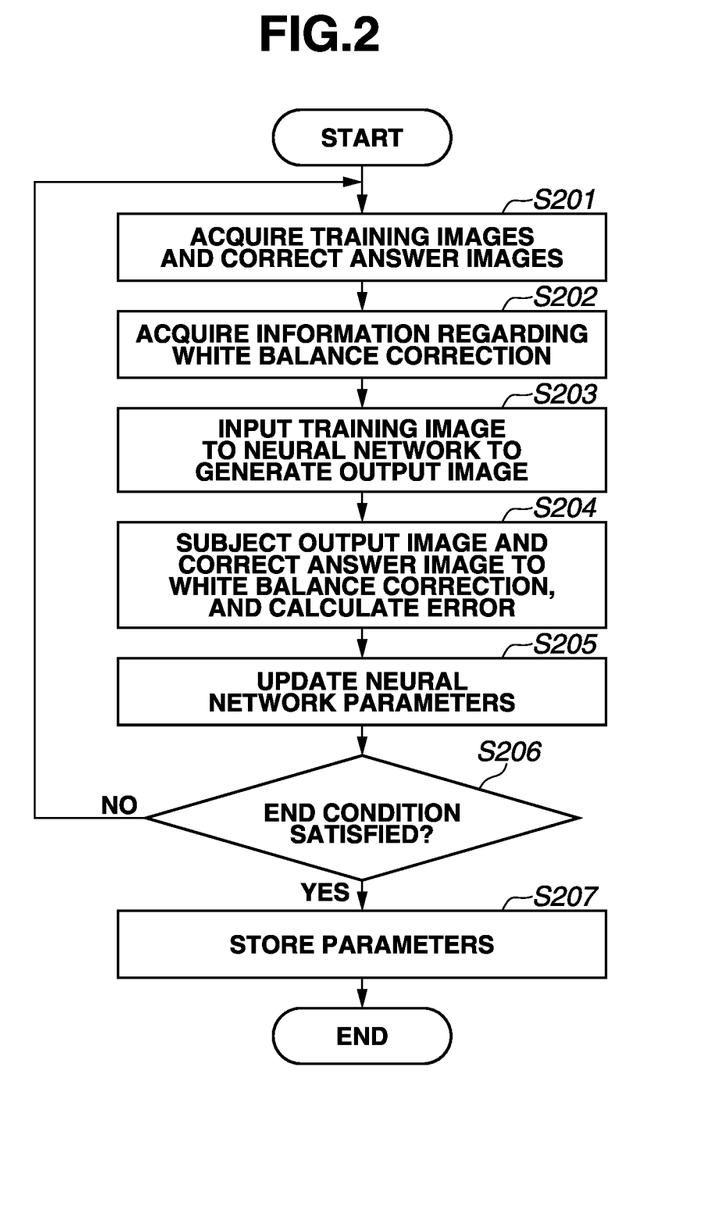
FIG. 2 is a flowchart illustrating a learning process according to the first exemplary embodiment.

FIG. 2 is a flowchart illustrating the learning process performed by the learning unit 103. The learning process performed when the white balance correction is applied to a RAW image will be described next with reference to FIG. 2. In FIGS. 2 and 4 to 7, each step number is preceded by a letter "S".

In step S201, the learning unit 103 acquires a training image and a correct answer image from the memory unit 105 as image acquisition processing. Each of the training image and the correct answer image is an undeveloped RAW image. In the present exemplary embodiment, the training image contains noise. The correct answer image shows the same subject as that of the training image and has no (or little) noise. The training image can be generated by applying noise to the correct answer image through simulation.

The training image may be obtained by capturing an image of the same subject as that of the correct answer image in a situation where noise can actually occur (e.g., with a high-sensitivity setting). In this case, the correct answer image is, for example, an image captured with low sensitivity. On the other hand, the training image can be an image captured with high sensitivity, or an image captured with low illuminance and then subjected to sensitivity correction so as to provide the same brightness as that of the correct answer image. A noise pattern or a subject structure (e.g., an edge) not included in an image used in the learning process is highly unlikely to be inferred accurately in the following inference process. Thus, the learning unit 103 acquires a plurality of training images and correct answer images in step S201 so that various noise patterns and subject structures are included in the images. Each of the plurality of training images may have a single noise pattern or a plurality of noise patterns mixed together.

In addition, in one embodiment, the respective signal values of the training image and the correct answer image are divided by the upper signal limits (saturated brightness values) for normalization. In this case, the learning unit 103 acquires the upper limits of the respective signal values of the training image and the correct answer image as upper limit acquisition processing, and normalizes the respective signal values of the training image and the correct answer image based on the acquired upper limits as normalization processing.

In step S202, the image processing apparatus 101 acquires information regarding the adjustment processing for changing the signal level of each color channel, for example, from the storage apparatus 121 as the information to be used in the learning process, and then stores the information in the memory unit 105. In the present exemplary embodiment, the information regarding the adjustment processing for changing the signal level of each color channel is information regarding the white balance correction. After the white balance correction, the signal level ratio between the color channels changes. In the present exemplary embodiment, the white balance correction to be used to develop an image inferred and generated by the inference unit 104 is the same as the white balance correction to be applied to the correct answer image and the output image in step S204 (described below). By making identical the white balance correction to be used to develop the inferred image and the white balance correction to be applied to the correct answer image and the output image, it is possible to perform inference with a more stable accuracy independent of the difference in noise between the color channels after the white balance correction. The processing in step S202 may be performed at any timing before the processing in step S204.

In step S203, the learning unit 103 selects at least one of the plurality of training images acquired in step S201 and inputs the selected training image to the neural network to generate an output image as output image generation processing. At this time, learning is performed using a plurality of training images having different noise patterns, so that effective noise reduction can be performed even when a captured image having an unlearned noise level is input in the inference process. If a sufficient number of training images are not prepared, an image subjected to clipping, rotation, inversion, and other padding processing may be prepared as a training image. In this case, the same processing is also applied to the correct answer image.

Figure 3:
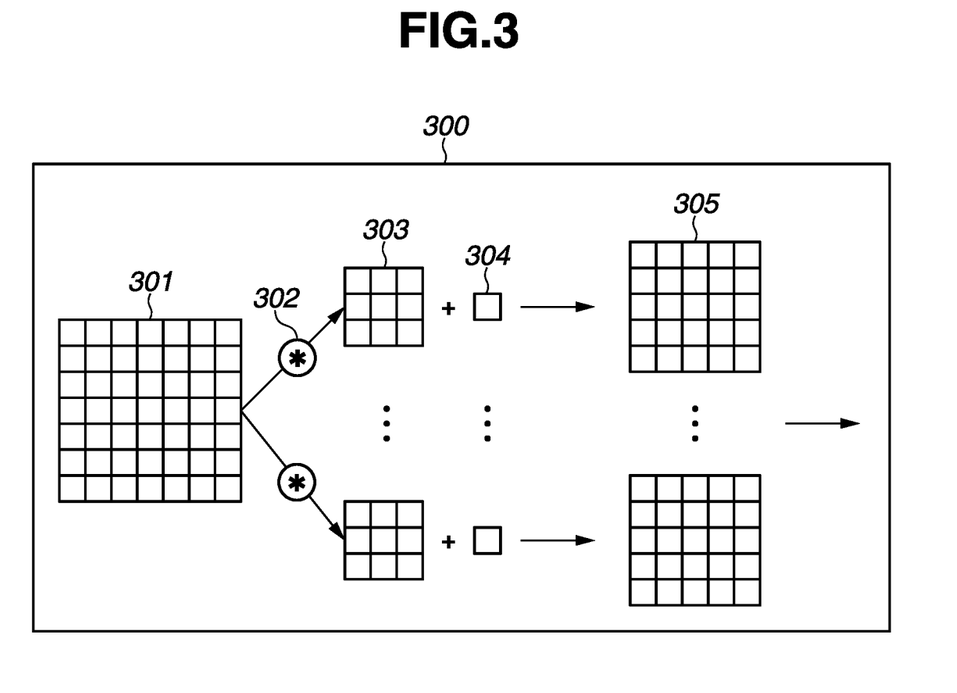
FIG. 3 is a diagram illustrating a concept of a neural network.

A process performed by a neural network 300 will be described next with reference to FIG. 3. FIG. 3 illustrates the neural network 300 that processes an input image 301. While in the present exemplary embodiment, a convolutional neural network (hereinafter referred to as a CNN) is described as an example of the neural network 300, the neural network 300 is not limited thereto. The neural network 300 may be, for example, a Generative Adversarial Network (GAN) or may have a skip connection. The neural network 300 may also be a Recurrent Neural Network (RNN).

Referring to FIG. 3, the input image 301 represents an image to be input to the neural network 300 or a feature map (described below). A convolution matrix 303 is a filter used to apply a convolution operation 302 to the input image 301. A bias 304 is a value to be added to the result output by the convolution operation 302 of the input image 301 with the convolution matrix 303. A feature map 305 is a result of the convolution operation 302 after the addition of the bias 304.

FIG. 3 illustrates a small number of neurons, intermediate layers, and channels for simplification. However, the number of neurons and layers, and the number of connections and weights between neurons are not limited thereto. When the neural network 300 is implemented in an FPGA, the number of connections and weights between neurons may be reduced.

In a CNN, a feature map for an input image can be obtained by performing a convolution operation using a certain filter having an arbitrary size. In the next layer, a different feature map is obtained by subjecting the feature map of the previous layer to the convolution operation using a different filter. In each layer, a certain input signal is multiplied with a filter and the sum of the multiplied input signal and the bias is obtained. Then, applying an activation function to the result gives an output signal for each neuron. The weight and bias in each layer are referred to as the network parameters. The values of the weight and bias (network parameters) are updated in the learning process. Examples of activation functions include the sigmoid function and the ReLU function. While in the present exemplary embodiment, the Leaky ReLU function represented by Formula (1) is used as the activation function, the activation function is not limited thereto. Referring to Formula (1), max represents a function that outputs the maximum value of arguments.

$$f(x)=\max(x, x*0.2) \tag{1}$$

In step S204, the learning unit 103 subjects each of the output image of the neural network and the correct answer image to the white balance correction, and acquires the error between the output image and the correct answer image after the white balance correction as error acquisition processing. The correct answer image has a color component array similar to that of the training image. In the error acquisition processing, the learning unit 103 acquires the error, for example, through calculation processing based on the mean square error between the signal levels of the output image and the correct answer image, or based on the sum of the absolute values of the differences in signal level between the pixels of the output image and the corresponding pixels of the correct answer image. In the error acquisition processing, calculation processing not based on the mean square error or the sum of the absolute values of the differences may be used.

In step S205, the learning unit 103 updates each of the network parameters using back-propagation so as to minimize the error calculated in step S204. In the present exemplary embodiment, the update method is not limited thereto. In addition, the amount of update for each of the network parameters may be fixed or variable.

In step S206, the learning unit 103 determines whether a predetermined end condition is satisfied. When the predetermined end condition is not satisfied (NO in step S206), the processing returns to step S201. In step S201, the learning unit 103 further performs learning. On the other hand, when the predetermined end condition is satisfied (YES in step S206), the processing proceeds to step S207. The predetermined end condition may be when the number of times of learning has reached a specified value or when the error is a predetermined value or below. Alternatively, the predetermined end condition may be when the error has hardly decreased or when the user has issued an end instruction.

In step S207, the learning unit 103 outputs information regarding the network parameters updated by learning and the structure of the neural network to the storage apparatus 121. The storage apparatus 121 stores the network parameters output from the learning unit 103.

As described above, in the learning process of the neural network, the image processing apparatus 101 according to the present exemplary embodiment subjects the output image of the neural network and the correct answer image to the same white balance correction. Then, the image processing apparatus 101 performs learning processing for updating (i.e., optimizing) the network parameters so as to minimize the error between the output image and the correct answer image after the white balance correction. This enables the image processing apparatus 101 according to the present exemplary embodiment to acquire a neural network with which, even after the white balance correction is subjected to a developed image, the inference accuracy is hardly affected and the image hardly takes up a specific tint.

In the present exemplary embodiment, noise reduction using a neural network has been described as an example.

However, the learning process can also be performed for other processing (described below) than the noise reduction, by preparing a pair of a training image and a correct answer image. For the processing other than noise reduction (described below), it is also possible to acquire a neural network with which, even after a developed image is subjected to adjustment processing such as the white balance correction, the tint of the image hardly changes.

For example, in the learning process of a neural network that implements super-resolution processing for generating an output image having a higher resolution than an input image, a training image having a lower resolution than that of a correct answer image can be prepared by downsampling the correct answer image. In this case, the correct answer image and the training image may or may not have the same size.

For example, in the learning process of a neural network that generates a less defocused output image or a less blurred (deblurred) output image from an input image, a training image can be prepared by applying defocus or blur application processing to a correct answer image. Defocus application to the correct answer image can be implemented by applying processing using a defocus function to the correct answer image.

For example, in the learning process of a neural network that generates an output image with color correction using color matrix correction from an input image, an image without appropriate color correction or without color correction may be used as a training image, while a correct answer image is color-corrected appropriately.

For example, in the learning process of a neural network that generates an output image with defective pixels interpolated from an input image, a training image with defective pixels is to be generated from a correct answer image without defective pixels.

For example, in the learning process of a neural network that generates demosaiced output images from an input image, a Bayer-array training image is to be prepared by resampling correct answer images acquired by using a three-plate type image sensor. The correct answer image is not limited to those acquired by using a three-plate type image sensor. The correct answer image may be an image acquired by using any other technique as long as the image has a plurality of pieces of color information per pixel. The training image may be acquired by using any other technique as long as the image has one piece of color information per pixel.

For example, in the learning process of a neural network that generates an output image of which color components are estimated based on an input image, a training image can be prepared by reducing the color components from a correct answer image.

For example, in the learning process of a neural network that generates a dehazed output image from an input image, a training image can be prepared by applying a haze component such as scattered light to a correct answer image not including a haze component such as mist through a physical phenomenon simulation.

Furthermore, in the case of a moving image including a plurality of continuous frames, collectively inputting a desired number of frames to a neural network in the depth direction in order of time sequence enables more effective noise reduction and the above-described processing other than the noise reduction.

Figure 4:
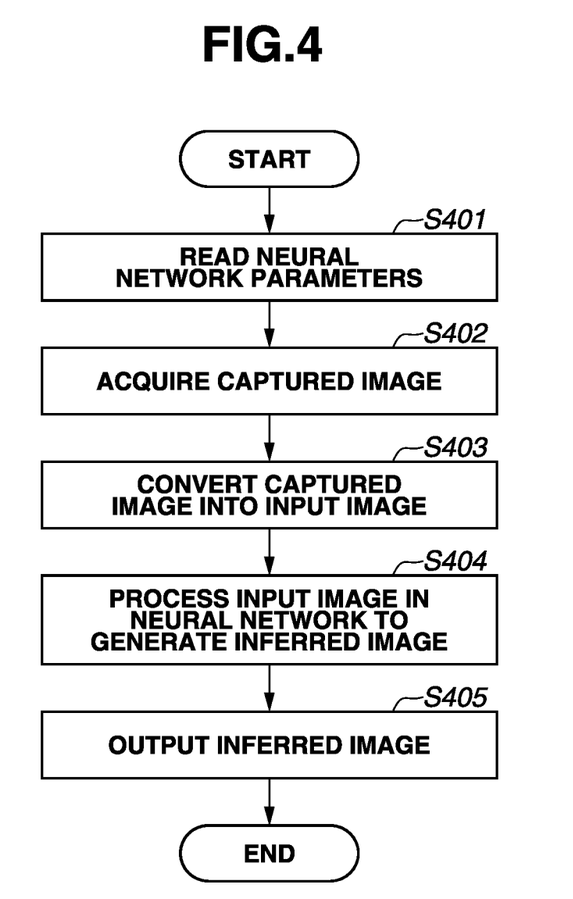
FIG. 4 is a flowchart illustrating an inference process.

Next, the inference process performed by the inference unit 104 will be described with reference to FIG. 4. FIG. 4 is a flowchart illustrating the inference process performed by the inference unit 104.

In step S401, the inference unit 104 acquires the network parameters updated and stored in the learning process. At this time, the inference unit 104 may read the network parameters from the storage apparatus 121, or acquire the network parameters read from the storage apparatus 121 and stored in the memory unit 105. The network parameters to be acquired by the inference unit 104 do not necessarily have to be learned by the learning unit 103, and may be learned by another image processing apparatus as long as the same network structure as that used in the learning process is used.

In step S402, the inference unit 104 acquires a captured image from the imaging apparatus 111, the storage apparatus 121, or the memory unit 105. At this time, the captured image is an undeveloped RAW image. If the RAW image has been subjected to encoding processing, the inference unit 104 performs decoding processing.

In step S403, the inference unit 104 converts the RAW image (captured image) into an input image to be input to the neural network. At this time, the inference unit 104 applies processing similar to that applied to the training image in the learning process, to the input image. The size of the input image does not necessarily have to match the size of the training image. Processing similar to that applied to the training image in the learning process includes the signal normalization and the separation processing for each color component. If the captured image is used without being processed in the learning process, the processing in step S403 may be omitted.

In step S404, the inference unit 104 inputs the input image to a neural network having a structure similar to that of the neural network used in the learning process. Then, the inference unit 104 generates an inferred image from the input image based on the network parameters of the neural network.

In step S405, the inference unit 104 outputs the inferred image to at least one of the storage apparatus 121, the imaging apparatus 111, and the display apparatus 131. At this time, the inference unit 104 may perform restoration processing when processing has been applied to the captured image in step S402.

As described above, the present exemplary embodiment makes it possible to implement an image processing system capable of acquiring a neural network with which, after a developed image is subjected to the white balance correction, the inference accuracy is hardly affected, and capable of performing inference by using the neural network.

While the processing for subjecting a RAW image to the white balance correction has been described above as an example, the present exemplary embodiment is also applicable to the processing for adjusting the color gamut and the luminance as in the HDR processing.

The learning process performed by the learning unit 103 when the color gamut and luminance adjustment processing is performed will be described next with reference to the flowchart illustrated in FIG. 5. Steps S501, S503, S505 to S507 in FIG. 5 are similar to steps S201, S203, and S205 to S207 in FIG. 2, respectively.

Figure 5:
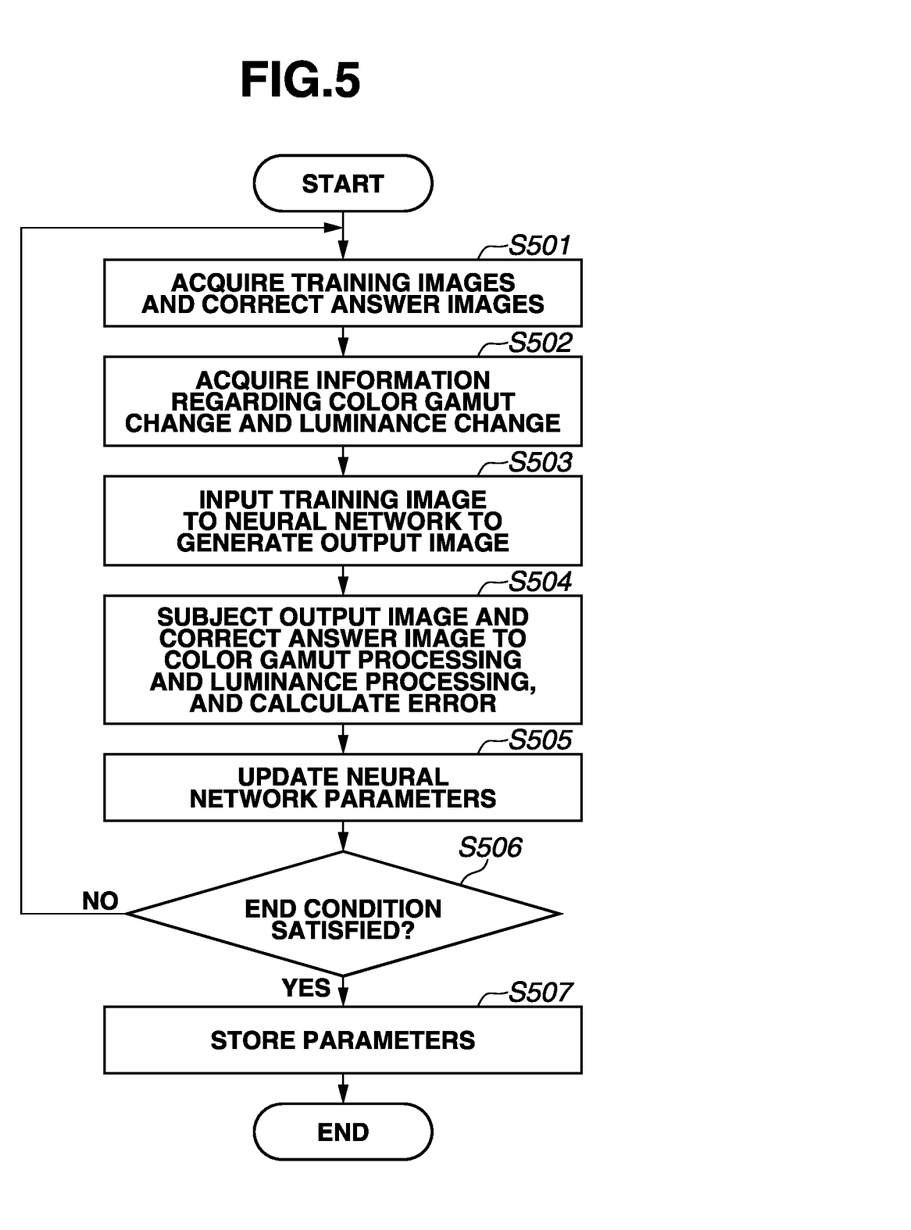
FIG. 5 is a flowchart illustrating another learning process according to the first exemplary embodiment.

In step S501 in FIG. 5, the learning unit 103 acquires a plurality of training images and a plurality of correct answer images.

In step S502, the image processing apparatus 101 acquires information regarding the color gamut processing and the luminance processing, for example, from the storage apparatus 121 as the information to be used in the learning process, and then stores the information in the memory unit 105. In the present exemplary embodiment, the information regarding the color gamut processing and the luminance processing indicates a color gamut change and a luminance change due to the above-described HDR processing or SDR processing. In step S502, if the neural network acquired in the learning process targets the HDR processing, the information regarding the color gamut change and luminance change in the HDR processing is acquired. If the neural network acquired in the learning process targets the SDR processing, the information regarding the color gamut change and luminance change in the SDR processing is acquired in step S502. In the present exemplary embodiment, the color gamut processing and the luminance processing to be used after the processing for developing the inferred image generated by the inference unit 104 are the same as the color gamut processing and the luminance processing to be performed on the correct answer image and the output image in step S504 (described below). By making identical the color gamut processing and the luminance processing for the inferred image and the color gamut processing and the luminance processing for the correct answer image and the output image, it is possible to perform inference with a stable accuracy independent of the difference in noise between the color channels after image processing including the color gamut processing and the luminance processing. The processing in step S502 may be performed at any timing before the processing in step S504.

In step S503, the learning unit 103 selects at least one of the plurality of training images acquired in step S501, and inputs the selected training image to the neural network to generate an output image.

In step S504, the learning unit 103 subjects each of the output image of the neural network and the correct answer image to the color gamut processing and the luminance processing, and acquires the error between the processed output image and the processed correct answer image as error acquisition processing. The correct answer image has a color component array similar to that of the training image. In the error acquisition processing, the learning unit 103 acquires the error, for example, through calculation processing based on the mean square error between the signal levels of the output image and the correct answer image or based on the sum of the absolute values of the differences in signal level between the pixels of the output image and the corresponding pixels of the correct answer image. In the error acquisition processing, calculation processing not based on the mean square error or the sum of the absolute values of the differences may also be used.

In step S505, the learning unit 103 updates the network parameters using back-propagation so as to minimize the error calculated in step S504.

In step S506, the learning unit 103 determines whether a predetermined end condition is satisfied. When the predetermined end condition is not satisfied (NO in step S506), the processing returns to step S501. In step S501, the learning unit 103 further performs learning. On the other hand, when the predetermined end condition is satisfied (YES in step S506), the processing proceeds to step S507.

In step S507, the learning unit 103 outputs information regarding the network parameters updated by learning and the structure of the neural network to the storage apparatus 121. The storage apparatus 121 stores the network parameters output from the learning unit 103.

While in the present exemplary embodiment, the example has been described where the image processing apparatus 101 includes both the learning unit 103 and the inference unit 104, the imaging apparatus 111 or the display apparatus 131 may include the inference unit 104. The imaging apparatus 111 or the display apparatus 131 including the inference unit 104 may receive the network parameters calculated based on the white balance correction or the HDR processing by the learning unit 103, and infer a noise-reduced image from a RAW image generated by the imaging apparatus 111. The inference unit 104 includes, for example, a CPU or a dedicated or general-purpose processor, or hardware such as an FPGA or an ASIC.

As described above, the image processing apparatus 101 according to the present exemplary embodiment makes it possible to acquire a neural network with which, even when an image is subjected to the processing for adjusting the color gamut and the luminance, the inference accuracy is hardly affected and the image hardly takes up a specific tint.

An image processing system according to a second exemplary embodiment will be described next. The present exemplary embodiment differs from the first exemplary embodiment in that, in the learning process, the white balance correction is performed on the training image before input of the image to the neural network. In the present exemplary embodiment, the difference from the first exemplary embodiment will be mainly described. Regarding configurations and processing similar to those according to the first exemplary embodiment, detailed descriptions will be omitted.

The learning process performed by the learning unit 103 according to the present exemplary embodiment will be described next with reference to the flowchart illustrated in FIG. 6. Steps S601, S602, S604, and S606 to S608 in FIG. 6 are similar to steps S201, S202, S203, and S205 to S207 in FIG. 2 according to the first exemplary embodiment, respectively.

Figure 6:
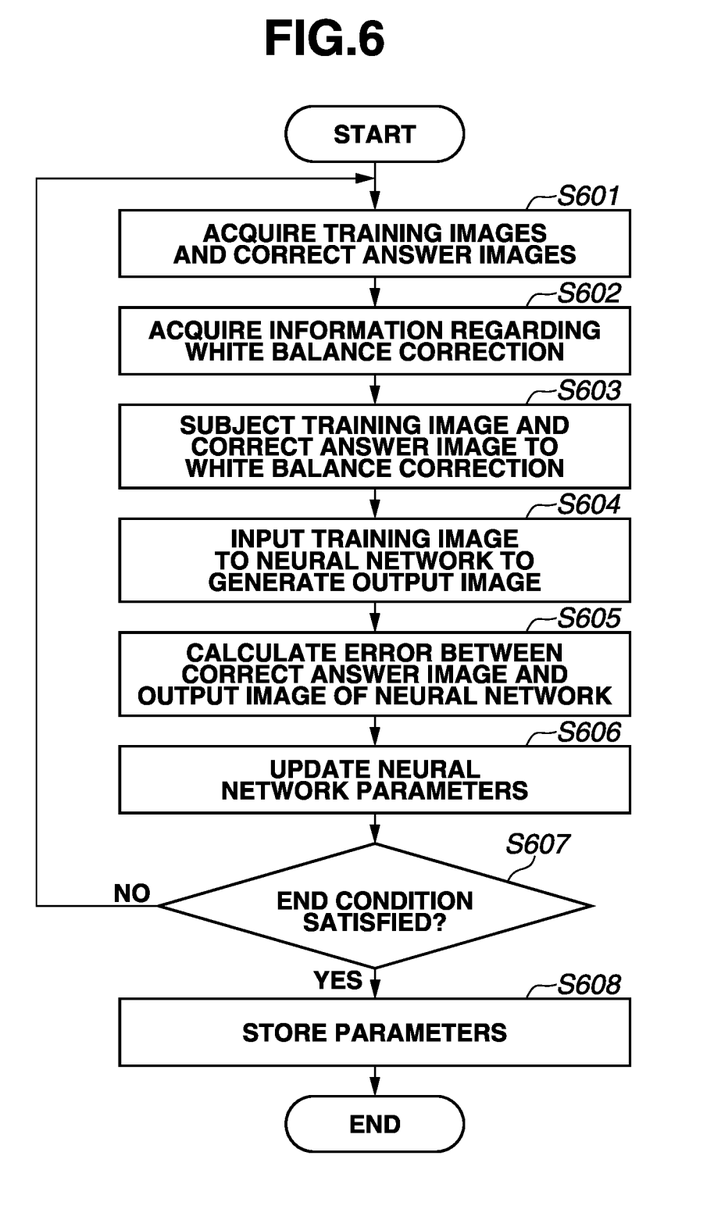
FIG. 6 is a flowchart illustrating a learning process according to a second exemplary embodiment.

In step S603 following step S602 in FIG. 6, the learning unit 103 subjects each of the training image and the correct answer image to the white balance correction. At this time, as the coefficient for the white balance correction, the learning unit 103 uses the same coefficient for both the training image and the correct answer image. After the learning unit 103 performs the processing in step S603, the processing proceeds to step S604 and then step S605.

In step S605, the learning unit 103 calculates the error between the correct answer image and the output image of the neural network. In the present exemplary embodiment, the white balance correction is not performed at this timing. The method for calculating the error is similar to that in step S204 in FIG. 2.

As described above, in the learning process, the image processing apparatus 101 according to the present exemplary embodiment subjects each of the training image and the correct answer image to the same white balance correction, and processes the training image subjected to the white balance correction in the neural network. The image processing apparatus 101 then performs learning processing for updating (optimizing) the network parameters so as to minimize the error between the correct answer image and the output image of the neural network. In this way, the image processing apparatus 101 according to the present exemplary embodiment makes it possible to acquire a neural network with which, even after a developed image is subjected to the white balance correction, the inference accuracy is hardly affected.

In the present exemplary embodiment, the inference process performed by the inference unit 104 is similar to the inference process according to the first exemplary embodiment described above with reference to FIG. 4, and redundant description thereof will be omitted.

While the processing for subjecting a RAW image to the white balance correction has been described above as an example, the present exemplary embodiment is also applicable to the processing for adjusting the color gamut and the luminance as in the HDR processing.

Figure 7:
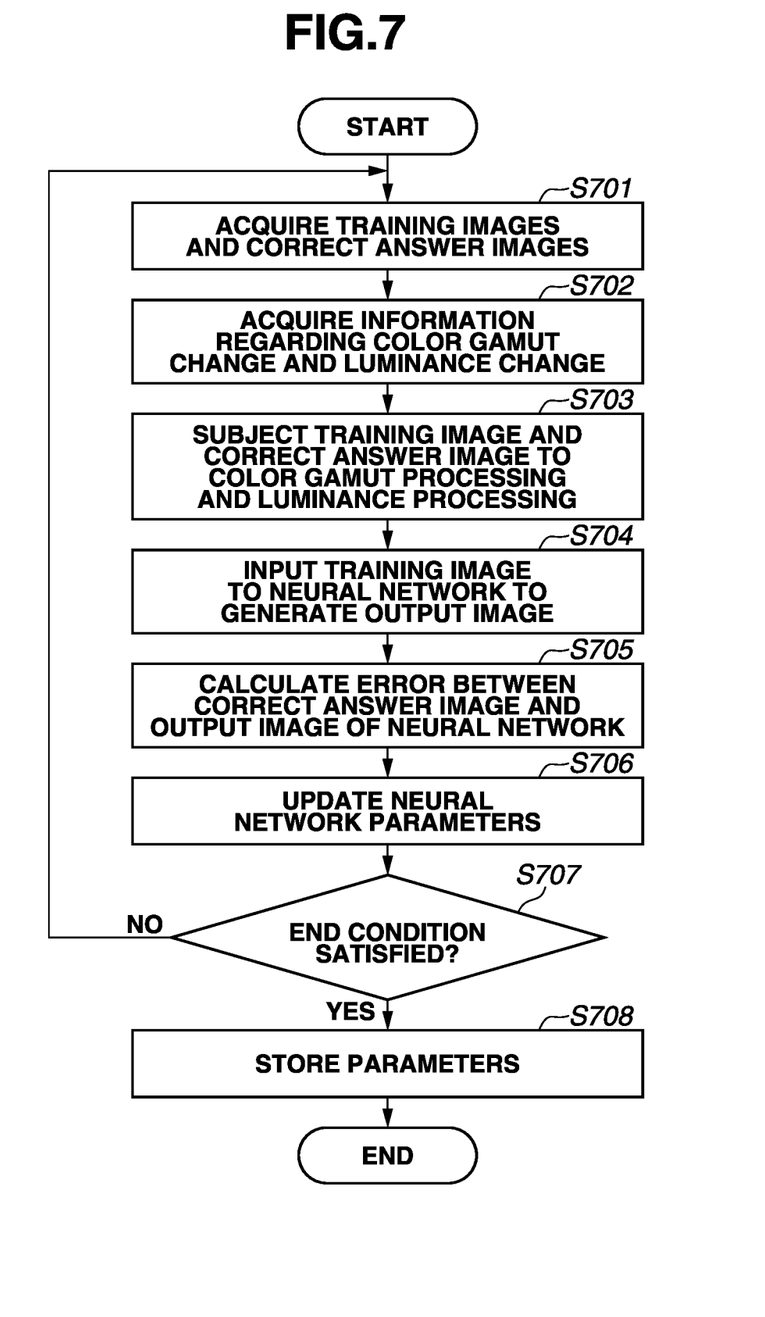
FIG. 7 is a flowchart illustrating another learning process according to the second exemplary embodiment.

Steps S701 and S704 to S708 in the flowchart illustrated in FIG. 7 are similar to steps S601 and S604 to S608 in FIG. 6, respectively. In step S702 following step S701 in FIG. 7, the image processing apparatus 101 acquires information regarding the color gamut processing and the luminance processing, for example, from the storage apparatus 121 as the information to be used in the learning process, and stores the information in the memory unit 105. In step S703, the learning unit 103 subjects each of the training image and the correct answer image to the processing for adjusting the color gamut and the luminance. Processing in step S704 and subsequent steps is similar to processing in step S604 and subsequent steps in FIG. 6, and redundant descriptions thereof will be omitted.

An image processing system according to a third exemplary embodiment will be described next. The present exemplary embodiment assumes a broadcast control system dedicated for simultaneous broadcast of SDR and HDR video images performed on broadcasting sites. In the present exemplary embodiment, in the learning of a neural network, processing based on edited video images to be viewed by the user is applied to improve the inference accuracy. SDR and HDR video images are largely different in the color gamut and luminance ranges, which affects the inference accuracy. Thus, in the present exemplary embodiment, an example will be described where a neural network having a high inference accuracy can be acquired even with the large differences in the color gamut and luminance ranges. Regarding configurations and processing similar to those according to the first exemplary embodiment, detailed descriptions will be omitted.

Figure 8:
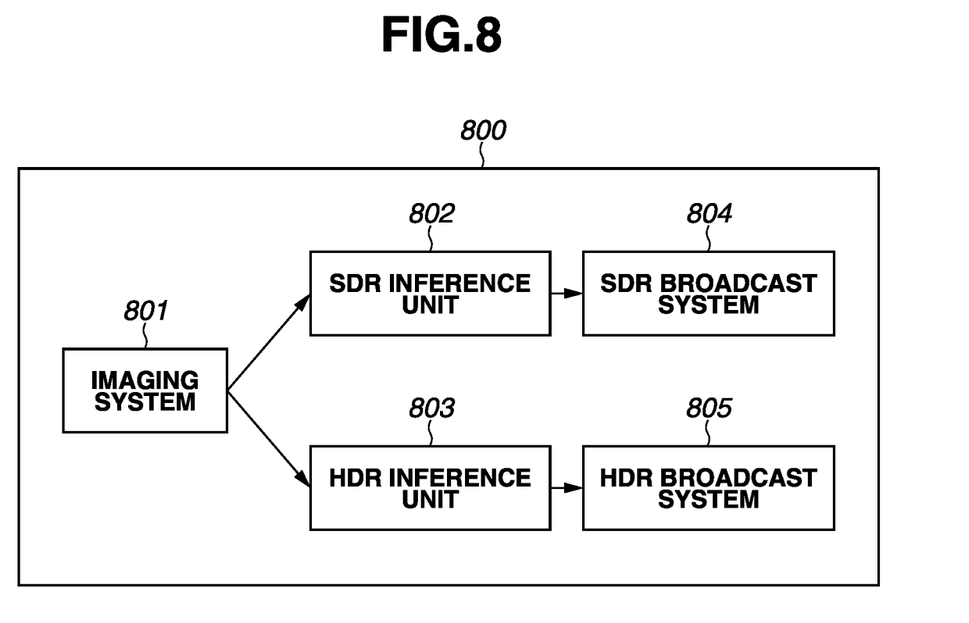
FIG. 8 is a flowchart illustrating a process performed by a broadcast control system according to a third exemplary embodiment.

FIG. 8 schematically illustrates a configuration of a broadcast control system 800 according to the present exemplary embodiment. Processes performed by the broadcast control system 800 according to the present exemplary embodiment will be described next with reference to FIG. 8.

The broadcast control system 800 manages video images captured by one or more imaging apparatuses.

A video image captured and output by an imaging system 801 is input to an SDR inference unit 802 and an HDR inference unit 803.

The SDR inference unit 802 has network parameters updated in the learning of a neural network with video images for SDR, and performs inference based on the input video image using the neural network. The inference result by the SDR inference unit 802 is output to an SDR broadcast system 804 and then broadcasted by the SDR broadcast system 804.

The HDR inference unit 803 has network parameters updated in the learning of a neural network with video images for HDR, and performs inference based on the input video image using the neural network. The inference result by the HDR inference unit 803 is output to an HDR broadcast system 805 and then broadcasted by the HDR broadcast system 805.

Although, in the example illustrated in FIG. 8, the SDR inference unit 802 and the HDR inference unit 803 are configured as separate units, the SDR inference unit 802 and the HDR inference unit 803 may be integrated into one inference unit as long as the processing speed and other parameters satisfy the specifications. In this case, the one inference unit performs inference by switching between the network parameters updated in the learning with video images for SDR and the network parameters updated in the learning with video images for HDR.

The above-described image processing systems according to the first and the second exemplary embodiments are applicable not only to imaging apparatuses including digital cameras and digital video cameras but also to industrial cameras, on-vehicle cameras, medical application cameras, monitoring cameras, smart phones and tablet terminals having a camera function. The image processing apparatus 101 according to the present exemplary embodiment is also capable of applying the above-described processing to images captured by these imaging apparatuses, stored in the storage apparatus 121, and then read therefrom, or to images downloaded via a network such as a communication line.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus comprising:
one or more processors that execute a program stored in a memory to function as:
an image acquisition unit configured to acquire a training image and a correct answer image;
a generation unit configured to input the training image to a neural network and to generate an output image based on output signal from the neural network;
an error acquisition unit configured to subject each of the correct answer image and the output image a white balance correction or processing for changing a color gamut, and to acquire an error between the correct answer image and the output image that have been subject to the white balance correction or the processing for changing the color gamut; and an update unit configured to update parameters of the neural network based on the acquired error.

2. The apparatus according to claim 1, wherein the update unit stores the updated parameters in the memory.

3. The apparatus according to claim 1, wherein the image acquisition unit acquires a set of the correct answer image and the training image, the set being related to at least one of noise, resolution, defocus, blur, color correction, signal interpolation, demosaic, or haze.

4. An apparatus comprising:
one or more processors that execute a program stored in a memory to function as:
an image acquisition unit configured to acquire a training image and a correct answer image;
an execution unit configured to subject each of the training image and the correct answer image to a white balance correction or processing for changing a color gamut;
a generation unit configured to input the training image that have been subject to the white balance correction or the processing for changing the color gamut by the execution unit to a neural network to generate an output image based on output signal from the neural network;
an error acquisition unit configured to acquire an error between the correct answer image and the output image that have been subject to the white balance correction or the processing for changing the color gamut; and
an update unit configured to update parameters of the neural network based on the acquired error.

5. The apparatus according to claim 4, wherein the update unit stores the updated parameters in the memory.

6. The apparatus according to claim 4, wherein the acquisition unit acquires a set of the correct answer image and the training image, the set being related to at least one of noise, resolution, defocus, blur, color correction, signal interpolation, demosaic, or haze.

7. A method performed by an apparatus, the method comprising:
acquiring a training image and a correct answer image;
subjecting each of the training image and the correct answer image to a white balance correction or processing for changing a color gamut;
inputting the training image that have been subject to the white balance correction or the processing for changing the color gamut to a neural network to generate an output image based on output signal from the neural network;
acquiring an error between the correct answer image and the output image that have been subject to the white balance correction or the processing for changing the color gamut; and
updating parameters of the neural network based on the acquired error.

8. A method performed by an apparatus, the method comprising:
acquiring a training image and a correct answer image;
inputting the training image to a neural network and generating an output image based on output signal from the neural network;
subjecting each of the correct answer image and the output image to a white balance correction or processing for changing a color gamut;
acquiring an error between the correct answer image and the output image that have been subject to the white balance correction or the processing for changing the color gamut; and
updating parameters of the neural network based on the acquired error.

* * * * *